United States Patent
Yin et al.

(10) Patent No.: US 9,945,659 B2
(45) Date of Patent: Apr. 17, 2018

(54) OPTICAL FIBER LENGTH MEASUREMENT METHOD AND APPARATUS

(71) Applicant: Huawei Technologies Co., Ltd., Shenzhen (CN)

(72) Inventors: Jian Yin, Wuhan (CN); Fan He, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/469,229

(22) Filed: Mar. 24, 2017

(65) Prior Publication Data

US 2017/0199026 A1    Jul. 13, 2017

Related U.S. Application Data

(63) Continuation of application No. PCT/CN2015/089539, filed on Sep. 14, 2015.

(30) Foreign Application Priority Data

Sep. 25, 2014   (CN) .......................... 2014 1 0499609

(51) Int. Cl.
*G01B 11/02* (2006.01)
*H04B 10/07* (2013.01)
*G01M 11/00* (2006.01)

(52) U.S. Cl.
CPC ............. *G01B 11/02* (2013.01); *G01M 11/33* (2013.01); *G01M 11/332* (2013.01); *H04B 10/07* (2013.01)

(58) Field of Classification Search
CPC ....... G01B 11/02; G01M 11/30; G01M 11/31; G01M 11/33; G01M 11/332; H04B 10/07;
(Continued)

(56) References Cited

U.S. PATENT DOCUMENTS 5,446,533 A    8/1995   Udd et al.
5,801,818 A    9/1998   Corrigan et al.
(Continued)

FOREIGN PATENT DOCUMENTS

CN        1889470 A      1/2007
CN      101441070 A      5/2009
(Continued)

OTHER PUBLICATIONS

Quanyi et al., "Fiber Length Measurement System Based on Phase Modulation Optical Link," Chinese Journal of Lasers, vol. 40, No. 5 (May 2013).

*Primary Examiner* — Gordon J Stock, Jr.
(74) *Attorney, Agent, or Firm* — Leydig, Voit & Mayer, Ltd.

(57) ABSTRACT

Embodiments of the present invention provide an optical fiber length measurement method and apparatus, where the method is used to measure an optical fiber length between a first device and a second device, and the method includes: acquiring, by a measurement device, timestamp parameters, where the timestamp parameters include a first transmit timestamp $T_{a1}$, a first receive timestamp $T_{a2}$, a second transmit timestamp $T_{b1}$, and a second receive timestamp $T_{b2}$; and determining, by the measurement device, the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$. The method does not depend on a dedicated measurement instrument such as an OTDR, an OFDR, or an OCDR, thereby simplifying a measurement process, and helping reduce a measurement cost.

10 Claims, 4 Drawing Sheets

A measurement device acquires timestamp parameters, where the timestamp parameters include a first transmit timestamp $T_{a1}$, a first receive timestamp $T_{a2}$, a second transmit timestamp $T_{b1}$, and a second receive timestamp $T_{b2}$ — 101

The measurement device determines an optical fiber length L according to the timestamp parameters — 102

(58) Field of Classification Search
CPC ............. H04B 10/073; H04B 10/0731; H04B 10/075; H04B 10/077; H04B 10/0773; H04B 10/0775; H04B 10/079; H04B 10/0793; H04B 10/0795
USPC ................................................. 356/73.1, 634
See application file for complete search history.

(56) References Cited

U.S. PATENT DOCUMENTS

| | | | |
|---|---|---|---|
| 7,403,274 B2 * | 7/2008 | Bottman | G01M 11/3145 356/73.1 |
| 7,808,623 B2 | 10/2010 | Piciaccia et al. | |
| 8,189,180 B2 * | 5/2012 | Bato | H04B 10/0773 356/73.1 |
| 9,154,224 B2 * | 10/2015 | Yin | H04L 43/50 |
| 9,379,771 B2 * | 6/2016 | Fludger | H04B 10/073 |
| 2009/0010642 A1 * | 1/2009 | Sui | H04B 10/0793 398/9 |
| 2012/0237205 A1 | 9/2012 | Duncan et al. | |
| 2015/0104167 A1 * | 4/2015 | Bottari | H04B 10/0775 398/16 |
| 2016/0105341 A1 * | 4/2016 | Cavaliere | H04B 10/07 398/33 |

FOREIGN PATENT DOCUMENTS

| | | |
|---|---|---|
| CN | 101771467 A | 7/2010 |
| CN | 102142891 A | 8/2011 |
| CN | 102494617 A | 6/2012 |
| CN | 103245490 A | 8/2013 |
| CN | 103429847 A | 12/2013 |
| EP | 2410676 A1 | 1/2012 |
| JP | 2004064494 A | 2/2004 |

* cited by examiner

OPTICAL FIBER LENGTH MEASUREMENT METHOD AND APPARATUS

CROSS-REFERENCE TO RELATED APPLICATIONS

This application is a continuation of International Application No. PCT/CN2015/089539, filed on Sep. 14, 2015, which claims priority to Chinese Patent Application No. 201410499609.8, filed on Sep. 25, 2014. The disclosures of the aforementioned applications are hereby incorporated by reference in their entireties.

TECHNICAL FIELD

The present invention relates to the field of communications technologies, and specifically, to an optical fiber length measurement method and apparatus.

BACKGROUND

Optical fiber transmission has advantages such as strong interference immunity, a low loss, and high transmission reliability. Therefore, fiber-optic communication has become a main transmission means on a modern communications network, and is applied to various fields in daily life. Generally, aspects such as optical fiber test, optical cable layout, and a fault check all involve optical fiber length measurement. It can be said that optical fiber length measurement is an important technical basis for implementing fiber-optic communication.

Currently, an optical fiber length is mostly measured by using an optical fiber length measurement instrument. For example, the optical fiber length is measured by using an optical time domain reflectometer (optical time domain reflectometer, OTDR), an optical frequency domain reflectometry (optical frequency domain reflectometry, OFDR), an optical coherence domain reflectometry (Optical Coherence Domain Reflectometry, OCDR), and the like. These measurement manners have many deficiencies such as a high measurement cost and poor measurement precision, and consequently, these measurement manners are limited to some degree in a practical application. Therefore, a new solution for measuring an optical fiber length is desperately needed currently.

SUMMARY

According to an optical fiber length measurement method and apparatus in embodiments of the present invention, a solution for measuring an optical fiber length in a simplified manner is provided, thereby helping simplify a measurement process and reduce a measurement cost.

Therefore, the embodiments of the present invention provide the following technical solutions:

According to a first aspect, an optical fiber length measurement method is provided, where the method is used to measure an optical fiber length between a first device and a second device, the first device and the second device are directly connected by using an optical fiber, and the method includes:

acquiring, by a measurement device, timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the measurement device, the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

In a first possible implementation manner of the first aspect, the acquiring, by a measurement device, timestamp parameters includes:

receiving, by the measurement device, the first transmit timestamp $T_{a1}$ and the second receive timestamp $T_{b2}$ that are sent by the first device; and receiving, by the measurement device, the first receive timestamp $T_{a2}$ and the second transmit timestamp $T_{b1}$ that are sent by the second device.

In a second possible implementation manner of the first aspect, the acquiring, by a measurement device, timestamp parameters includes:

receiving, by the measurement device, the timestamp parameters sent by the first device, where the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording; or receiving, by the measurement device, the timestamp parameters sent by the second device, where the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

According to a second aspect, an optical fiber length measurement method is provided, where the method is used to measure an optical fiber length between a first device and a second device, the first device and the second device are directly connected by using an optical fiber, and the method includes:

acquiring, by the first device, timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the first device, the optical fiber length L according to the timestamp parameters, where when $(T_{a2}-T_{b1})+(T_{b2}-T_{a1})\leq n*T$, $L=2.5*[(T_{a2}-T_{b1})+(T_{b2}-T_{a1})]$, or when $(T_{a2}-T_{b1})+(T_{b2}-T_{a1})>n*T$, $L=2.5*[(T_{a2}-T_{b1})+(T_{b2}-T_{a1})-n*T]$, where n is a natural number.

In a first possible implementation manner of the second aspect, the acquiring, by the first device, timestamp parameters includes:

obtaining, by the first device, the first transmit timestamp $T_{a1}$ and the second receive timestamp $T_{b2}$ by recording; and receiving, by the first device, the first receive timestamp $T_{a2}$ and the second transmit timestamp $T_{b1}$ that are sent by the second device.

According to a third aspect, an optical fiber length measurement apparatus is provided, where the apparatus is configured to measure an optical fiber length between a first device and a second device, the first device and the second device are directly connected by using an optical fiber, and the apparatus includes:

an acquiring unit, configured to acquire timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and a determining unit, configured to determine the optical fiber length L according to the timestamp parameters acquired by the acquiring unit, where when $(T_{a2}-T_{b1})+(T_{b2}-T_{a1})\leq n*T$, $L=2.5*[(T_{a2}-T_{b1})+(T_{b2}-T_{a1})]$, or when $(T_{a2}-T_{b1})+(T_{b2}-T_{a1})>n*T$, $L=2.5*[(T_{a2}-T_{b1})+(T_{b2}-T_{a1})-n*T]$, where n is a natural number.

In a first possible implementation manner of the third aspect, the acquiring unit includes:

a first receiving unit, configured to receive the first transmit timestamp $T_{a1}$ and the second receive timestamp $T_{b2}$ that are sent by the first device; and a second receiving unit, configured to receive the first receive timestamp $T_{a2}$ and the second transmit timestamp $T_{b1}$ that are sent by the second device.

In a second possible implementation manner of the third aspect, the acquiring unit is specifically configured to receive the timestamp parameters sent by the first device, where the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording; or the acquiring unit is specifically configured to receive the timestamp parameters sent by the second device, where the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

According to a fourth aspect, an optical fiber length measurement apparatus is provided, where the apparatus is configured to measure an optical fiber length between a first device and a second device, the first device and the second device are directly connected by using an optical fiber, and the apparatus includes:

an acquiring unit, configured to acquire timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and a determining unit, configured to determine the optical fiber length L according to the timestamp parameters acquired by the acquiring unit, where when $(T_{a2}-T_{b1})+(T_{b2}-T_{a1})\leq n*T$, $L=2.5*[(T_{a2}-T_{b1})+(T_{b2}-T_{a1})]$, or when $(T_{a2}-T_{b1})+(T_{b2}-T_{a1})>n*T$, $L=2.5*[(T_{a2}-T_{b1})+(T_{b2}-T_{a1})-n*T]$, where n is a natural number.

In a first possible implementation manner of the fourth aspect, the acquiring unit includes:

a recording unit, configured to obtain the first transmit timestamp $T_{a1}$ and the second receive timestamp $T_{b2}$ by recording; and a receiving unit, configured to receive the first receive timestamp $T_{a2}$ and the second transmit timestamp $T_{b1}$ that are sent by the second device.

According to the optical fiber length measurement method and apparatus in the embodiments of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

BRIEF DESCRIPTION OF DRAWINGS

To describe the technical solutions in the embodiments of the present application more clearly, the following briefly introduces the accompanying drawings required for describing the embodiments or the prior art. Apparently, the accompanying drawings in the following description show merely some embodiments recorded in the present application, and a person of ordinary skill in the art may still derive other drawings from these accompanying drawings.

DESCRIPTION OF EMBODIMENTS

In order to enable a person skilled in the art to better understand the solutions in the present invention, the following describes the embodiments of the present invention in more detail with reference to accompanying drawings and implementation manners.

Currently, an optical fiber length measurement manner is mostly implemented by using a measurement instrument such as an OTDR, an OFDR, or an OCDR. The OTDR is produced mainly according to Rayleigh back-scattering and Fresnel reflection theories. Due to an inherent error such as a graduation error and a resolution error of the measurement instrument, and a calculation error generated by setting parameters such as a group refractive index of an optical fiber, a back-scattering loss coefficient, and a coefficient of optical fiber cabling, measurement precision of this measurement manner is relatively poor. A basic principle for measuring an optical fiber length by the OFDR is performing frequency modulation on a laser light source. This measurement manner imposes an extremely demanding requirement on the laser light source, limited in application. Similar to the OFDR, the OCDR imposes a demanding requirement on a light source, and this measurement manner is not suitable for measuring a long optical fiber.

It can be learned from the foregoing description that, all existing measurement manners need to be implemented by using a dedicated measurement instrument, and a measurement cost is relatively high. In view of this, the embodiments of the present invention provide a manner of measuring an optical fiber length in a simple way, which helps simplify a measurement process and reduce a measurement cost. The following explains a process of measuring an optical fiber length in the embodiments of the present invention.

For example, a measurement device in the embodiments of the present invention may be an independent device that can communicate with a first device and/or a second device, or the measurement device may also be a first device or a second device that integrates a function of the measurement device. A form of the measurement device may not be specifically limited in the embodiments of the present invention, provided that the measurement device can communicate with the first device and/or the second device.

Embodiment 1

Figure 1:
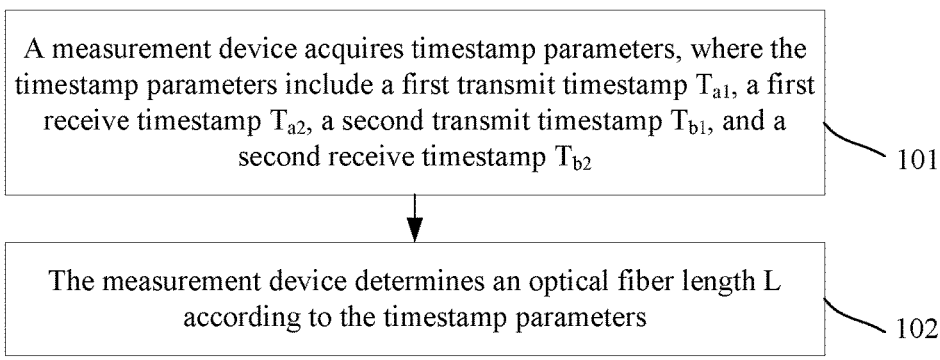
FIG. 1 is a flowchart of an optical fiber length measurement method according to an embodiment of the present invention.

Referring to FIG. 1, this embodiment of the present invention provides an optical fiber length measurement method. The method is used to measure an optical fiber length between a first device and a second device, the first device and the second device are directly connected by using an optical fiber, and the method includes:

101. A measurement device acquires timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet.

102. The measurement device determines the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

In this embodiment, the measurement device may be an independent device or another device that can communicate with the first device and/or the second device and integrates a function of the measurement device, that is, the measurement device in this embodiment is a third-party device except the first device and the second device. The measurement device may measure the optical fiber length according to the solution provided in this embodiment of the present invention, which helps simplify a measurement process and reduce a measurement cost.

First, the measurement device can obtain the following timestamp parameters:

(1) The first transmit timestamp $T_{a1}$, where this timestamp may represent a timestamp at which the first device sends the first measurement packet to the second device.

(2) The second transmit timestamp $T_{b1}$, where this timestamp may represent a timestamp at which the second device sends the second measurement packet to the first device.

(3) The first receive timestamp $T_{a2}$, where this timestamp may represent a timestamp at which the second device receives the first measurement packet sent by the first device, and may be a timestamp at which the second device receives, after sending the second measurement packet at $T_{b1}$, the first measurement packet sent by the first device. For example, reference may be made to schematic diagrams shown in FIG. 2 and FIG. 3. $T_{a2}$ is a timestamp at which the second device receives for the first time, after sending the second measurement packet at $T_{b1}$, the first measurement packet sent by the first device. The first measurement packet received for the first time may be a first measurement packet that is sent by the first device at $T_{a1}$ and that is shown in FIG.

Figure 3:
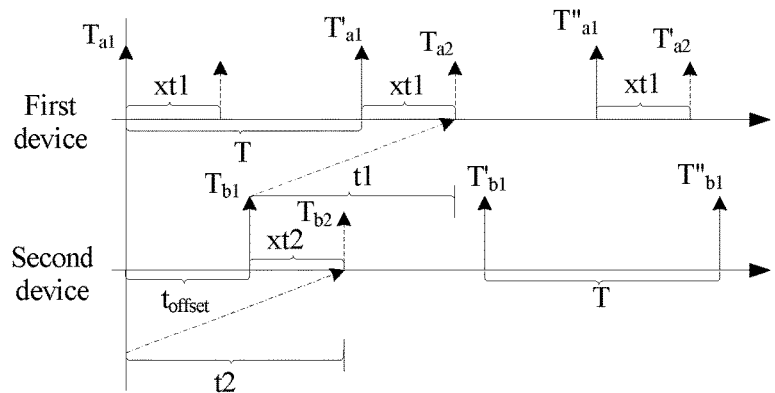
FIG. 3 is a schematic diagram of another time sequence relationship between $T_{a2}$ and $T_{b1}$ according to an embodiment of the present invention.

2, or may be a first measurement packet that is sent by the first device at T'$_{a1}$ after the interval T and that is shown in FIG. 3.

(4) The second receive timestamp T$_{b2}$, where this timestamp may represent a timestamp at which the first device receives the second measurement packet sent by the second device, and may be a timestamp at which the first device receives, after sending the first measurement packet at T$_{a1}$, the second measurement packet sent by the second device. For example, T$_{b2}$ is a timestamp at which the first device receives for the first time, after sending the first measurement packet at T$_{a1}$, the second measurement packet sent by the second device. The second measurement packet received for the first time may be a second measurement packet sent by the second device at T$_{b1}$, or may be a second measurement packet sent by the second device at T'$_{b1}$ after the interval T.

Figure 2:
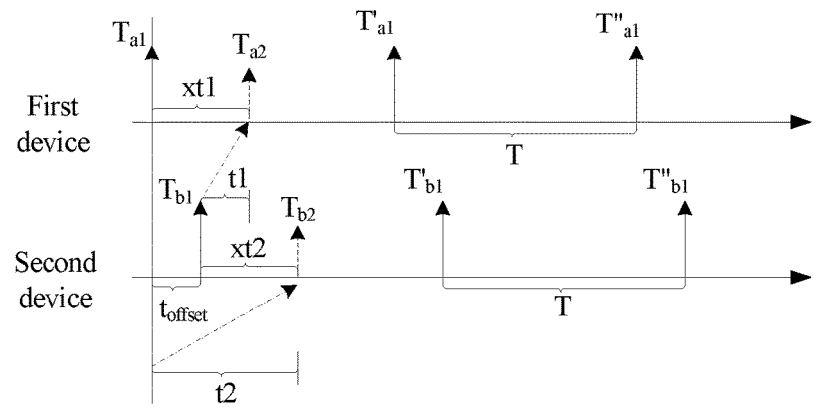
FIG. 2 is a schematic diagram of a time sequence relationship between $T_{a2}$ and $T_{b1}$ according to an embodiment of the present invention.

It should be noted that, as shown in FIG. 2 and FIG. 3, at a corresponding interval, if time when the second device sends the second measurement packet is later than time when the first device sends the first measurement packet, T$_{b2}$ is a timestamp at which the first device receives the second measurement packet sent by the second device at T$_{b1}$, and T$_{a2}$ may be represented by the two cases described in the foregoing (3). At a corresponding interval, if time when the second device sends the second measurement packet is earlier than time when the first device sends the first measurement packet, T$_{a2}$ is a timestamp at which the second device receives the first measurement packet sent by the first device at T$_{a1}$, and T$_{b2}$ may be represented by the two cases described in the foregoing (4). In addition, a manner in which the measurement device obtains the timestamp parameters is not described in detail herein. For details, reference may be made to the following descriptions.

Second, the measurement device determines the optical fiber length by using the timestamp parameters.

According to a value relationship between (T$_{a2}$−T$_{b1}$)+(T$_{b2}$−T$_{a1}$) and a preset interval T, this embodiment of the present invention provides two manners of determining the optical fiber length. With reference to the accompanying drawings, the following explains the manners of determining the optical fiber length in this embodiment of the present invention.

(1) When (T$_{a2}$−T$_{b1}$)+(T$_{b2}$−T$_{a1}$)≤n*T the optical fiber length L=2.5*[(T$_{a2}$−T$_{b1}$)+(T$_{b2}$−T$_{a1}$)].

Referring to an example shown in FIG. 2, the first device may send the first measurement packet according to the preset interval T, and the second device may also send the second measurement packet according to the same preset interval T. In addition, at a corresponding interval, the timestamp T$_{b1}$ at which the second device sends the second measurement packet is t$_{offset}$ later than the timestamp T$_{a1}$ at which the first device sends the first measurement packet, and 0≤t$_{offset}$≤xt1, where xt1 may represent a time during which the first measurement packet is transmitted from the first device to the second device through a measured optical fiber, and correspondingly, a time during which the second measurement packet is transmitted from the second device to the first device through the measured optical fiber may be represented as xt2.

In addition, referring to FIG. 2, the following two time differences may further be obtained: a time difference t1 of the second device, that is, a time difference between the time when the second device sends the second measurement packet and the time when the second device receives for the first time the first measurement packet, which may be represented as t1=T$_{a2}$−T$_{b1}$; a time difference t2 of the first device, that is, a time difference between the time when the first device sends the first measurement packet and the time when the first device receives for the first time the second measurement packet, which may be represented as t2=T$_{b2}$−T$_{a1}$.

In this case, the following two formulas can be obtained according to a schematic diagram of a time sequence shown in FIG. 2:

$$t2 = t_{offset} + xt2 \quad (1)$$

$$xt1 = t_{offset} + t1 \quad (2)$$

With reference to the formula (1) and the formula (2), the following can be obtained:

$$t2 - xt1 = xt2 - t1 \quad (3)$$

With reference to the formula (3), the following can be obtained:

$$t2 + t1 = xt1 + xt2 \quad (4)$$

Optionally, the measured optical fiber in this embodiment of the present invention may be a single-mode optical fiber or a multi-mode optical fiber. If the measured optical fiber is a multi-mode optical fiber, that is, that the first device sends the first measurement packet to the second device and that the first device receives the second measurement packet sent by the second device are both implemented by using a same optical fiber, if transmission speeds are the same, xt1=xt2. If the measured optical fiber is a single-mode optical fiber, that is, the first device sends the first measurement packet to the second device by using a transmit optical fiber, and the first device receives, by using a receive optical fiber, the second measurement packet sent by the second device, and considering that a distance of a laying position of the transmit optical fiber to that of the receive optical fiber is relatively short during optical fiber laying, if transmission speeds are the same, it may be considered that xt1=xt2. Therefore, the following formula can be obtained:

With reference to the formula (4), the following can be obtained:

$$xt1 = xt2 = (t2+t1)/2 = (T_{b2}-T_{a1}+T_{a2}-T_{b1})/2 \quad (5)$$

With reference to the formula (5), the following can be obtained: L=5 m/ns*(T$_{b2}$−T$_{a1}$+T$_{a2}$−T$_{b1}$)/2=2.5 m/ns*(T$_{b2}$−T$_{a1}$+T$_{a2}$−T$_{b1}$), where 5 m/ns is a speed at which an optical signal is transmitted in the optical fiber.

(2) When (T$_{a2}$−T$_{b1}$)+(T$_{b2}$−T$_{a1}$)>n*T, the optical fiber length L=2.5*[(T$_{a2}$−T$_{b1}$)+(T$_{b2}$−T$_{a1}$)−n*T], where n is a natural number.

Referring to an example shown in FIG. 3, the first device may send the first measurement packet according to the preset interval T, and the second device may also send the second measurement packet according to the same preset interval T. In addition, at a corresponding interval, the timestamp T$_{b1}$ at which the second device sends the second measurement packet is t$_{offset}$ later than the timestamp T$_{a1}$ at which the first device sends the first measurement packet, and xt1≤t$_{offset}$, where xt1 may represent a time during which the first measurement packet is transmitted from the first device to the second device through a measured optical fiber, and correspondingly, a time during which the second measurement packet is transmitted from the second device to the first device through the measured optical fiber may be represented as xt2.

In addition, referring to FIG. 3, the following two time differences may further be obtained: a time difference t1 of the second device, that is, a time difference between the time when the second device sends the second measurement packet and the time when the second device receives for the first time the first measurement packet, which may be represented as $t1=T_{a2}-T_{b1}$; a time difference t2 of the first device, that is, a time difference between the time when the first device sends the first measurement packet and the time when the first device receives for the first time the second measurement packet, which may be represented as $t2=T_{b2}-T_{a1}$.

In this case, the following two formulas can be obtained according to a schematic diagram of a time sequence shown in FIG. 3:

$$t2=t_{offset}+xt2 \quad (6)$$

$$T+xt1=t_{offset}+t1 \quad (7)$$

With reference to the formula (6) and the formula (7), the following can be obtained:

$$t2-xt1-T=xt2-t1 \quad (8)$$

With reference to the formula (8), the following can be obtained:

$$t2+t1-T=xt1+xt2 \quad (9)$$

Optionally, as described above, the measured optical fiber in this embodiment of the present invention may be a single-mode optical fiber or a multi-mode optical fiber, and if transmission speeds are the same, $xt1=xt2$. Therefore, the following formula can be obtained:

With reference to the formula (9), the following can be obtained:

$$xt1=xt2=(t2+t1-T)/2=(T_{b2}-T_{a1}+T_{a2}-T_{b1}-T)/2 \quad (10)$$

With reference to the formula (10), the following can be obtained: $L=5$ m/ns*$(T_{b2}-T_{a1}+T_{a2}-T_{b1}-T)/2=2.5$ m/ns*$(T_{b2}-T_{a1}+T_{a2}-T_{b1}-T)$, where 5 m/ns is a speed at which an optical signal is transmitted in the optical fiber.

For the foregoing two manners of determining the optical fiber length, after obtaining the timestamp parameters, the measurement device may directly calculate $(T_{a2}-T_{b1})+(T_{b2}-T_{a1})$ by using the timestamp parameters, and compare values of $(T_{a2}-T_{b1})+(T_{b2}-T_{a1})$ with the preset interval T, so as to select a manner of determining the optical fiber length.

Optionally, as described above, the first receive timestamp $T_{a2}$ may be a timestamp at which the second device receives for the first time, after sending the second measurement packet at $T_{b1}$, the first measurement packet sent by the first device. In a possible implementation manner, the first receive timestamp $T_{a2}$ may also be a timestamp at which the second device receives, after sending the second measurement packet at $T_{b1}$ and after n preset intervals expire, the first measurement packet sent by the first device, where n is a natural number. For example, n=2, and in this case, the first receive timestamp $T_{a2}$ may be represented as $T'_{a2}$ shown in FIG. 3. Correspondingly, the optical fiber length is $L=2.5*[(T_{a2}-T_{b1})+(T_{b2}-T_{a1})-2T]$, which is not specifically limited in this embodiment of the present invention.

Optionally, the preset interval T in this embodiment of the present invention may be set according to an actual requirement, which is not specifically limited in this embodiment of the present invention. For example, an optical fiber length $L_{estimate}$ can be estimated, and the preset interval T is determined according to $L_{estimate}$. As an example, a value of T may be represented as $T \geq L_{estimate}/5$ m/ns, where 5 m/ns is the speed at which the optical signal is transmitted in the optical fiber.

Optionally, the first measurement packet and the second measurement packet may carry an interval number, and packets that carry a same interval number may be considered to be at a corresponding interval. For example, referring to FIG. 2 and FIG. 3, when the first device sends, to the second device, a first measurement packet that carries an interval number 1, the first transmit timestamp may be recorded as $T_{a1}$. After the preset interval T, the first device sends, to the second device, a first measurement packet that carries an interval number 2, and the first transmit timestamp is recorded as $T'_{a1}$. After another preset interval T, the first device sends, to the second device, a first measurement packet that carries an interval number 3, and the first transmit timestamp is recorded as $T''_{a1}$, and by analogy, which is not described by using an example herein again. Correspondingly, when the second device sends, to the first device, a second measurement packet that carries the interval number 1, the second transmit timestamp may be recorded as $T_{b1}$. After the preset interval T, the second device sends, to the first device, a second measurement packet that carries the interval number 2, and the second transmit timestamp is recorded as $T'_{b1}$. After another preset interval T, the second device sends, to the first device, a second measurement packet that carries the interval number 3, and the second transmit timestamp is recorded as $T''_{b1}$, and by analogy, which is not described by using an example herein again. It can be learned that, the first measurement packet corresponding to $T_{a1}$ and the second measurement packet corresponding to $T_{b1}$ are packets at a corresponding interval, the first measurement packet corresponding to $T'_{a1}$ and the second measurement packet corresponding to $T'_{b1}$ are packets at a corresponding interval, and the first measurement packet corresponding to $T''_{a1}$ and the second measurement packet corresponding to $T''_{b1}$ are packets at a corresponding interval.

It can be learned from the foregoing description that, in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

Optionally, the manner in which the measurement device obtains the timestamp parameters may not be specifically limited in this embodiment of the present invention. As an example, the measurement device may obtain the timestamp parameters at least in the following two manners, and the following explains the two manners one by one.

Manner 1: The measurement device separately receives timestamps sent by the first device and timestamps sent by the second device.

(1) When sending the first measurement packet to the second device, the first device may obtain the first transmit timestamp $T_{a1}$ by recording. When receiving for the first time, after sending the first measurement packet, the second measurement packet sent by the second device, the first device may obtain the second receive timestamp $T_{b2}$ by recording. That is, the first device may send $T_{a1}$ and $T_{b2}$ to the measurement device. Similarly, when sending the second measurement packet to the first device, the second device may obtain the second transmit timestamp $T_{b1}$ by recording. When receiving for the first time, after sending the second measurement packet, the first measurement packet sent by the first device, the second device may obtain the first receive timestamp $T_{a2}$ by recording. That is, the second device may send $T_{b1}$ and $T_{a2}$ to the measurement device.

That is, the measurement device may obtain the timestamp parameters in a manner of receiving $T_{a1}$ and $T_{b2}$ that are sent by the first device and $T_{b1}$ and $T_{a2}$ that are sent by the second device.

(2) When sending the first measurement packet to the second device, the first device may obtain the first transmit timestamp $T_{a1}$ by recording, and add $T_{a1}$ to the first measurement packet and send the first measurement packet to the second device, that is, the second device may send $T_{a1}$, $T_{b1}$, and $T_{a2}$ to the measurement device.

That is, the measurement device may obtain the timestamp parameters in a manner of receiving $T_{b2}$ sent by the first device and $T_{a1}$, $T_{b1}$, and $T_{a2}$ that are sent by the second device.

Optionally, the measurement device may first receive the timestamps sent by the first device, and then receive the timestamps sent by the second device; or the measurement device may first receive the timestamps sent by the second device, and then receive the timestamps sent by the first device; or the measurement device may simultaneously receive the timestamps sent by the first device and the timestamps sent by the second device, and a sequence of receiving the timestamps by the measurement device may not be specifically limited in this embodiment of the present invention.

Manner 2: The measurement device receives timestamps sent by the first device or timestamps sent by the second device.

(1) The measurement device receives $T_{a1}$, $T_{b2}$, $T_{b1}$, and $T_{a2}$ that are sent by the second device, where $T_{a1}$ and $T_{b2}$ are obtained by the first device and are sent to the second device, and $T_{b1}$ and $T_{a2}$ are obtained by the second device.

Optionally, the first device may construct a third packet to send $T_{a1}$ and $T_{b2}$ to the second device, or the first device may add $T_{a1}$ to the first measurement packet and send the first measurement packet to the second device, and use a fourth packet to send $T_{b2}$ to the second device, and a manner in which the first device sends $T_{a1}$ and $T_{b2}$ to the second device may not be specifically limited in this embodiment of the present invention.

(2) The measurement device receives $T_{a1}$, $T_{b2}$, $T_{b1}$, and $T_{a2}$ that are sent by the first device, where $T_{a1}$ and $T_{b2}$ are obtained by the first device, and $T_{b1}$ and $T_{a2}$ are obtained by the second device and are sent to the first device.

Optionally, the second device may construct a fifth packet to send $T_{b1}$ and $T_{a2}$ to the first device, or the second device may add $T_{b1}$ and $T_{a2}$ to the second measurement packet and send the second measurement packet to the first device, and a manner in which the second device sends $T_{b1}$ and $T_{a2}$ to the first device may not be specifically limited in this embodiment of the present invention.

Embodiment 2

Figure 4:
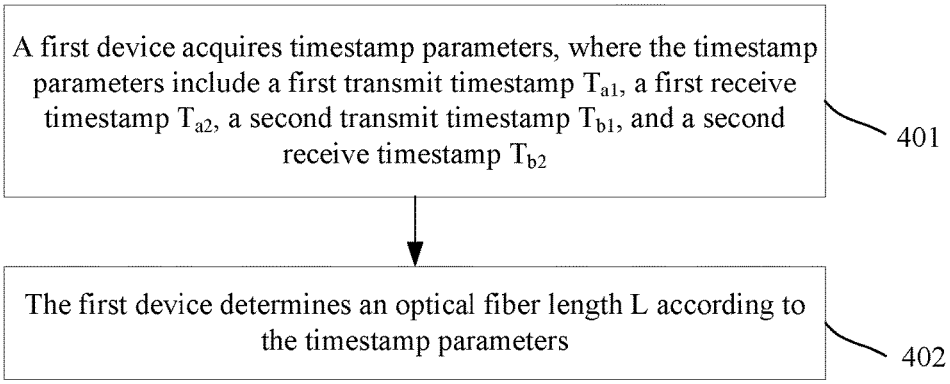
FIG. 4 is a flowchart of another optical fiber length measurement method according to an embodiment of the present invention.

Referring to FIG. 4, this embodiment of the present invention provides an optical fiber length measurement method. The method is used to measure an optical fiber length between a first device and a second device, the first device and the second device are directly connected by using an optical fiber, and the method includes:

401. The first device acquires timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet.

402. The first device determines the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

As described above, a measurement device may be the first device that integrates a function of the measurement device or the second device that integrates a function of the measurement device. In this embodiment, the measurement device may be the first device that integrates the function of the measurement device. The first device may measure the optical fiber length according to the solution provided in this embodiment of the present invention, which helps simplify a measurement process and reduce a measurement cost.

First, the first device obtains the timestamp parameters, which may include $T_{a1}$, $T_{a2}$, $T_{b1}$, and $T_{b2}$. For a manner in which the first device obtains the timestamp parameters, reference may be made to the following description, and details are not described herein.

Second, the first device determines the optical fiber length by using the timestamp parameters. For a manner in which the first device determines the optical fiber length, reference may be made to descriptions in Embodiment 1, and details are not described herein again.

It can be learned from the foregoing description that, in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

Optionally, the manner in which the first device obtains the timestamp parameters may not be specifically limited in this embodiment of the present invention. As an example, the first device may obtain the timestamp parameters at least in the following manner, and the following explains the manner.

When sending the first measurement packet to the second device, the first device may obtain the first transmit timestamp $T_{a1}$ by recording. When receiving for the first time, after sending the first measurement packet, the second measurement packet sent by the second device, the first device may obtain the second receive timestamp $T_{b2}$ by recording. That is, the first device may obtain $T_{a1}$ and $T_{b2}$ by recording.

Correspondingly, when sending the second measurement packet to the first device, the second device may obtain the second transmit timestamp $T_{b1}$ by recording. When receiving for the first time, after sending the second measurement packet, the first measurement packet sent by the first device, the second device may obtain the first receive timestamp $T_{a2}$ by recording. That is, the second device may obtain $T_{b1}$ and $T_{a2}$ by recording.

That is, the first device may obtain the timestamp parameters in a manner of recording $T_{a1}$ and $T_{b2}$ and receiving $T_{b1}$ and $T_{a2}$ that are sent by the second device.

With reference to a specific application scenario, the following explains a process of measuring the optical fiber length in this embodiment of the present invention.

Figure 5:
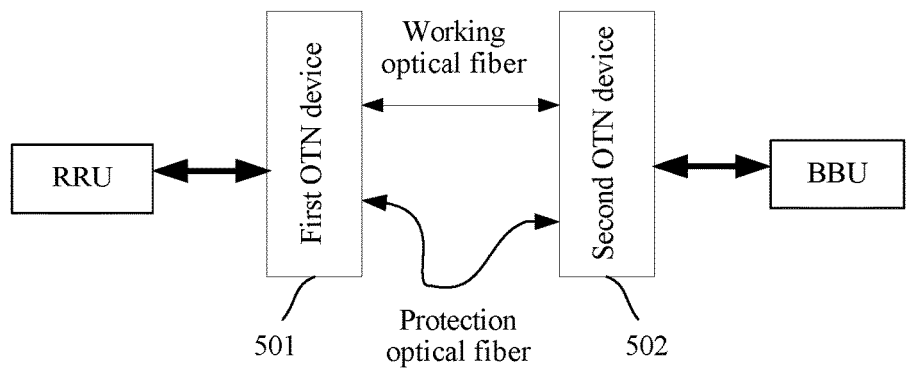
FIG. 5 is a schematic diagram of an application scenario according to an embodiment of the present invention.

To improve reliability of a communications system, two optical transport network (Optical Transport Network, OTN for short) devices may be disposed between a base band unit (Base band Unit, BBU for short) and a radio remote unit (Radio Remote Unit, RRU for short). As shown in FIG. 5, a first OTN device 501 and the RRU are directly connected by using a single optical fiber, a second OTN device 502 and the BBU are directly connected by using a single optical fiber, and the first OTN device and the second OTN device are directly connected by using a working optical fiber and a protection optical fiber. Generally, the first OTN device and the second OTN device communicate with each other by using the working optical fiber. In special cases, for example, the working optical fiber is accidentally damaged, the first OTN device and the second OTN device may perform automatic protection by switching from the working optical fiber to the protection optical fiber for communication, which helps protect a common public radio interface (Common Public Radio Interface, CPRI for short) service link between the BBU and the RRU, and avoid link re-establishment.

Generally, during optical fiber laying, to prevent damage to both the working optical fiber and the protection optical fiber from affecting normal communication between the BBU and the RRU, the working optical fiber is kept a specific distance from the protection optical fiber. That is, a length of the working optical fiber and a length of the protection optical fiber may not be equal. In this case, it means that if transmission speeds are the same, an absolute delay $T_{work}$ of the working optical fiber may also be different from an absolute delay $T_{protect}$ of the optical fiber. In this way, in the case of switching from protection the working optical fiber to the protection optical fiber, an absolute delay may change accordingly, causing CPRI service link re-establishment. Therefore, the solution provided in this embodiment of the present invention may be used to determine in advance the length of the working optical fiber and the length of the protection optical fiber, and perform time compensation for $T_{work}$ or $T_{protect}$ accordingly, which helps resolve a problem of CPRI service link re-establishment that is caused by optical fiber switching due to an optical fiber length difference.

It should be noted that, that the length of the working optical fiber and the length of the protection optical fiber may not be equal may be understood as that values of the two lengths are different, or that a difference between values of the two lengths exceeds a preset value, which may not be specifically limited in this embodiment of the present invention.

1. The length of the working optical fiber is measured by using the solution in this embodiment of the present invention.

In this embodiment, the length of the working optical fiber may be measured by the first OTN device or the second OTN device by using the solution shown in FIG. 4. For example, in this embodiment, the length of the working optical fiber may be measured by the first OTN device.

First, the first OTN device constructs a first measurement packet, sends the first measurement packet to the second OTN device by using the working optical fiber, and records a first transmit timestamp $T_{a11}$. Second, the second OTN device receives the first measurement packet transmitted by using the working optical fiber, and records a first receive timestamp $T_{a21}$. Then, the second OTN device constructs a second measurement packet, and adds $T_{a21}$ and $T_{b11}$ to the second measurement packet, where $T_{b11}$ is a timestamp at which the second OTN device sends the second measurement packet to the first OTN device by using the working optical fiber. Last, the first OTN device receives the second measurement packet transmitted by using the working optical fiber, and records a second receive timestamp $T_{b21}$.

After the foregoing process, the first OTN device obtains four timestamps, and can accordingly determine the length of the working optical fiber, that is, $L_1 = 2.5 \text{ m/ns} * (T_{b21} - T_{a11} + T_{a21} - T_{b11})$.

2. The length of the protection optical fiber is measured by using the solution in this embodiment of the present invention.

For example, in this embodiment, the length of the protection optical fiber may also be measured by the first OTN device. A process in which the first OTN device obtains four timestamps may be implemented with reference to a manner of measuring the length of the working optical fiber in the foregoing description, and details are not described herein again. What is different is that, in this embodiment, the first measurement packet is transmitted from the first OTN device to the second OTN device by using the protection optical fiber, and the second measurement packet is transmitted from the second OTN device to the first OTN device by using the protection optical fiber.

Similarly, the first OTN device obtains four timestamps $T_{a12}$, $T_{b22}$, $T_{b12}$, and $T_{a22}$, and can accordingly determine the length of the protection optical fiber, that is, $L_2 = 2.5 \text{ m/ns} * (T_{b22} - T_{a12} + T_{a22} - T_{b12})$.

3. Absolute delay compensation is performed according to the length of the working optical fiber and the length of the protection optical fiber.

For example, absolute delay compensation may be performed by the first OTN device or the second OTN device. For example, in this embodiment, absolute delay compensation may be performed by the first OTN device.

The first OTN device calculates the absolute delay of the working optical fiber, that is, $T_{work} = L_1/5$ m/ns, where 5 m/ns is a speed at which an optical signal is transmitted in the working optical fiber.

The first OTN device calculates the absolute delay of the protection optical fiber, that is, $T_{protect} = L_2/5$ m/ns, where 5 m/ns is a speed at which the optical signal is transmitted in the protection optical fiber.

The first OTN device performs time compensation for $T_{work}$ or $T_{protect}$. The first OTN device compares values of $T_{work}$ and $T_{protect}$, and performs compensation for a smaller absolute delay to obtain a value equal to a larger absolute delay. For example, $T_{work}$ is less than $T_{protect}$, and then the first OTN device may calculate a compensation value, that is, $\Delta = T_{protect} - T_{work}$, and perform compensation for the absolute delay of the working optical fiber to obtain $T'_{work} = T_{work} + \Delta = T_{protect}$.

After the foregoing absolute delay compensation is performed, the absolute delay of the working optical fiber between the first OTN device and the second OTN device is $T'_{work}$, and the absolute delay of the protection optical fiber is $T_{protect}$. In the case of switching from the working optical fiber to the protection optical fiber, the absolute delay does not change accordingly, which helps protect the CPRI service link between the BBU and the RRU, and avoid link re-establishment.

Figure 6:
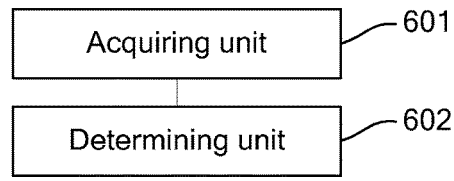
FIG. 6 is a schematic structural diagram of an optical fiber length measurement apparatus according to an embodiment of the present invention.

Corresponding to the method shown in FIG. 1, an embodiment of the present invention further provides an optical fiber length measurement apparatus, where the apparatus is configured to measure an optical fiber length between a first device and a second device, and the first device and the second device are directly connected by using an optical fiber. Referring to a schematic diagram shown in FIG. 6, the optical fiber length measurement apparatus may include:

an acquiring unit 601, configured to acquire timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and a determining unit 602, configured to determine the optical fiber length L according to the timestamp parameters acquired by the acquiring unit, where when $(T_{a2}-T_{b1})+(T_{b2}-T_{a1}) \le n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

Optionally, the acquiring unit includes:

a first receiving unit, configured to receive the first transmit timestamp $T_{a1}$ and the second receive timestamp $T_{b2}$ that are sent by the first device; and a second receiving unit, configured to receive the first receive timestamp $T_{a2}$ and the second transmit timestamp $T_{b1}$ that are sent by the second device.

Optionally, the acquiring unit is specifically configured to receive the timestamp parameters sent by the first device, where the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording; or the acquiring unit is specifically configured to receive the timestamp parameters sent by the second device, where the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

It can be learned from the foregoing description that, according to the measurement apparatus in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

It should be noted that, the optical fiber length measurement apparatus provided in this apparatus embodiment may be an independent device that can communicate with the first device and/or the second device, or may be another device that can communicate with the first device and/or the second device and integrates a function of a measurement device, which may not be specifically limited in this embodiment of the present invention. The optical fiber length measurement apparatus in this embodiment of the present invention uses the method embodiment shown in the foregoing FIG. 1, and implements a function of the measurement device in the method embodiment. For other additional functions that can be implemented by the optical fiber length measurement apparatus, refer to descriptions of the measurement device in the method embodiment, and details are not described herein again.

In addition, according to the optical fiber length measurement apparatus provided in the foregoing embodiment, when the optical fiber length is measured, description is given only by using division of the foregoing functional modules as an example. In practical application, the functions may be allocated to different functional modules for implementation according to a requirement. That is, an internal structure of the apparatus is divided into different functional modules to implement all or a part of the functions described above.

Figure 7:
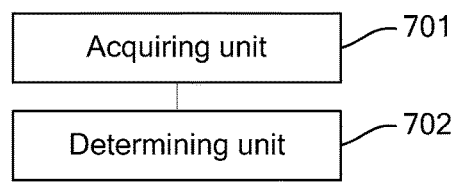
FIG. 7 is a schematic structural diagram of another optical fiber length measurement apparatus according to an embodiment of the present invention.

Corresponding to the method shown in FIG. 4, an embodiment of the present invention further provides another optical fiber length measurement apparatus, where the apparatus is configured to measure an optical fiber length between a first device and a second device, and the first device and the second device are directly connected by using an optical fiber. Referring to a schematic diagram shown in FIG. 7, the optical fiber length measurement apparatus may include:

an acquiring unit 701, configured to acquire timestamp parameters, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and a determining unit 702, configured to determine the optical fiber length L according to the timestamp parameters acquired by the acquiring unit, where when $(T_{a2}-T_{b1})+(T_{b2}-T_{a1}) \le n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

Optionally, the acquiring unit includes:

a recording unit, configured to obtain the first transmit timestamp $T_{a1}$ and the second receive timestamp $T_{b2}$ by recording; and a receiving unit, configured to receive the first receive timestamp $T_{a2}$ and the second transmit timestamp $T_{b1}$ that are sent by the second device.

It can be learned from the foregoing description that, according to the measurement apparatus in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

It should be noted that, the optical fiber length measurement apparatus provided in this apparatus embodiment may be the first device that integrates a function of a measurement device or the second device that integrates the function of the measurement device, which may not be specifically limited in this embodiment of the present invention. In this embodiment, the optical fiber length measurement apparatus may be specifically the first device that integrates the function of the measurement device. The optical fiber length measurement apparatus in this embodiment of the present invention uses the method embodiment shown in the foregoing FIG. 4, and implements a function of the first device in the method embodiment. For other additional functions that can be implemented by the optical fiber length measurement apparatus, refer to descriptions of the first device in the method embodiment, and details are not described herein again.

In addition, according to the optical fiber length measurement apparatus provided in the foregoing embodiment, when the optical fiber length is measured, description is given only by using division of the foregoing functional modules as an example. In practical application, the functions may be allocated to different functional modules for implementation according to a requirement. That is, an internal structure of the apparatus is divided into different functional modules to implement all or a part of the functions described above.

An embodiment of the present invention further provides an optical fiber length measurement device, where the measurement device may be an independent device that can communicate with a first device and/or a second device, or may be another device that can communicate with a first device and/or a second device and integrates a function of the measurement device. The measurement device is configured to measure an optical fiber length between the first device and the second device, and the first device and the second device are directly connected by using an optical fiber. Referring to a schematic diagram shown in FIG. 8, an optical fiber length measurement device 800 may include a processor 801, a memory 802, a network interface 803, and a bus system 804.

The bus system 804 is configured to couple hardware components of the measurement device together.

The network interface 803 is configured to implement a communication connection between the measurement device and at least one another network element by means of the Internet, a wide area network, a local network, a metropolitan area network, or the like.

The memory 802 is configured to store a program instruction and data.

The processor 801 is configured to read the instruction and the data that are stored in the memory 802, so as to execute the following operations:

acquiring, by the processor, timestamp parameters by using the network interface, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the processor, the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

Optionally, the processor executes the following operations to acquire the timestamp parameters:

receiving, by the processor by using the network interface, the first transmit timestamp $T_{a1}$ and the second receive timestamp $T_{b2}$ that are sent by the first device; and receiving, by the processor by using the network interface, the first receive timestamp $T_{a2}$ and the second transmit timestamp $T_{b1}$ that are sent by the second device.

Optionally, the processor executes the following operations to acquire the timestamp parameters:

receiving, by the processor by using the network interface, the timestamp parameters sent by the first device, where the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording; or receiving, by the processor by using the network interface, the timestamp parameters sent by the second device, where the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

It can be learned from the foregoing description that, according to the measurement apparatus in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

An embodiment of the present invention further provides another optical fiber length measurement device, where the measurement device may be a first device that integrates a function of the measurement device. The measurement device is configured to measure an optical fiber length between the first device and a second device, and the first device and the second device are directly connected by using an optical fiber. Referring to a schematic diagram shown in FIG. 9, an optical fiber length measurement device 900 may include a processor 901, a memory 902, a network interface 903, and a bus system 904.

The bus system 904 is configured to couple hardware components of the measurement device together.

The network interface 903 is configured to implement a communication connection between the measurement device and at least one another network element by means of the Internet, a wide area network, a local network, a metropolitan area network, or the like.

The memory 902 is configured to store a program instruction and data.

The processor 901 is configured to read the instruction and the data that are stored in the memory 902, so as to execute the following operations:

acquiring, by the processor, timestamp parameters by using the network interface, where: the timestamp parameters include a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the processor, the optical fiber length L according to the timestamp parameters, where when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, where n is a natural number.

Optionally, the processor executes the following operations to acquire the timestamp parameters:

obtaining, by the processor, the first transmit timestamp $T_{a1}$ and the second receive timestamp $T_{b2}$ by recording; and receiving, by the processor by using the network interface, the first receive timestamp $T_{a2}$ and the second transmit timestamp $T_{b1}$ that are sent by the second device.

It can be learned from the foregoing description that, according to the measurement apparatus in this embodiment of the present invention, an optical fiber length is measured without depending on a dedicated measurement instrument such as an OTDR, an OFDR, or an OCDR. The optical fiber length can be determined by using timestamp parameters recorded by a first device and a second device that are at both ends of an optical fiber, thereby simplifying a measurement process. In addition, this also helps reduce a measurement cost because no additional device such as the dedicated measurement instrument or a laser light source needs to be involved in the measurement process.

Figure 8:
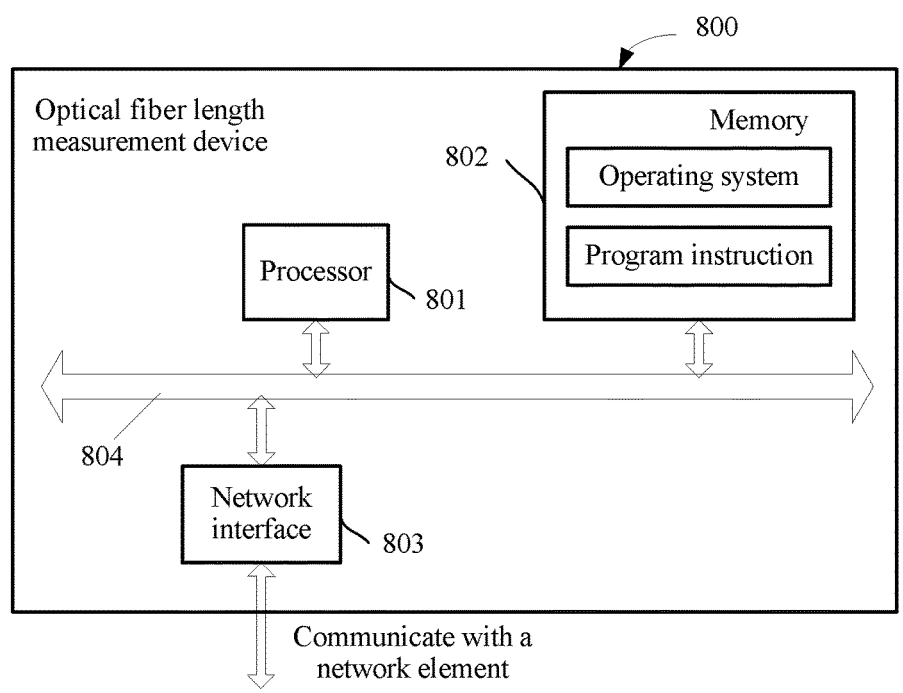
FIG. 8 is a schematic structural diagram of hardware of an optical fiber length measurement apparatus according to an embodiment of the present invention.
Figure 9:
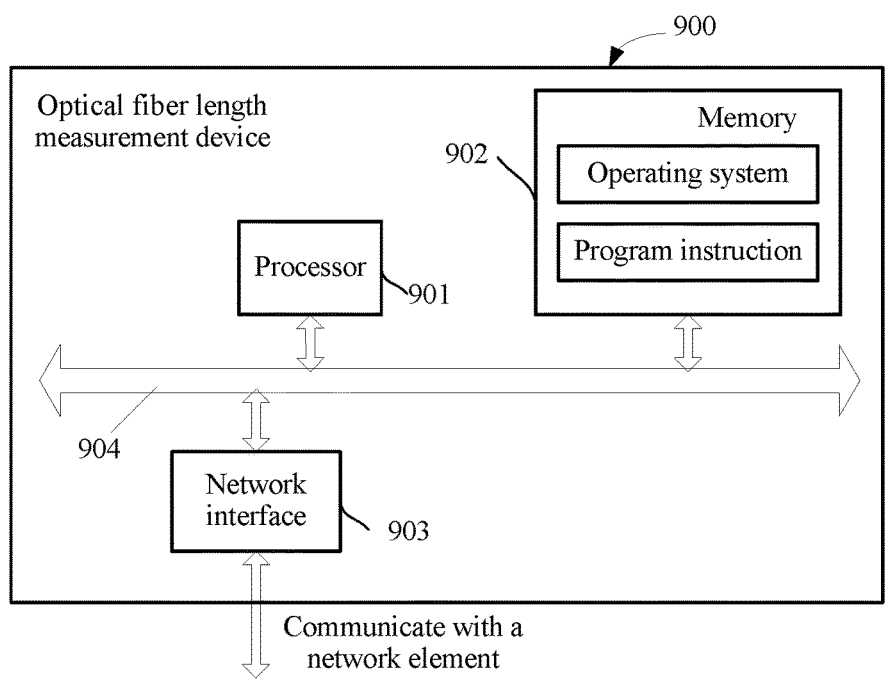
FIG. 9 is a schematic structural diagram of hardware of another optical fiber length measurement apparatus according to an embodiment of the present invention.

For example, the processor in FIG. 8 and FIG. 9 may be an integrated circuit chip, and has a signal processing capability. In an implementation process, steps in the foregoing methods may be completed by using an integrated logic circuit of hardware in the processor or instructions in a form of software. These instructions may be implemented and controlled by cooperation of the processor, and are used to execute the methods disclosed in the embodiments of the present invention. The processor may also be a general purpose processor, a digital signal processor (Digital Signal Processor, DSP), an application-specific integrated circuit (application specific integrated circuit), a field programmable gate array (Field Programmable Gate Array, FPGA), or another programmable logical device, discrete gate or transistor logical device, or discrete hardware component.

The general purpose processor may be a microprocessor, or the processor may be any conventional processor, decoder, or the like. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register.

In addition to including a data bus, the bus system in FIG. 8 and FIG. 9 may further include a power bus, a control bus, and a status signal bus. However, for clear description, various types of buses in the figure are marked as the bus system.

Based on the foregoing descriptions of the implementation manners, a person skilled in the art may clearly understand that all or some steps of the methods in the foregoing embodiments may be implemented by software in addition to a necessary general hardware platform. Based on such an understanding, the technical solutions of the present invention essentially or the part contributing to the prior art may be implemented in a form of a software product. The computer software product is stored in a storage medium, such as a ROM/RAM, a hard disk, or an optical disc, and includes several instructions for instructing a computer device (which may be a personal computer, a server, a network communications device such as media gateway, or the like) to perform the methods described in the embodiments or some parts of the embodiments of the present invention.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

The foregoing descriptions are merely optional embodiments of the present invention, but are not intended to limit the protection scope of the present invention. It should be noted that a person of ordinary skill in the art may make some improvements and polishing without departing from the principle of the present invention and the improvements and polishing shall fall within the protection scope of the present invention.

What is claimed is:

1. An optical fiber length measurement method, wherein the method is used to measure an optical fiber length between a first device and a second device, the first device and the second device are directly connected by using an optical fiber, and the method comprises:

acquiring, by a measurement device, timestamp parameters, wherein: the timestamp parameters comprise a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the measurement device, the optical fiber length L according to the timestamp parameters, the measurement device comprising a processor and nonvolatile memory coupled to the processor, wherein when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, wherein n is a natural number.

2. The method according to claim 1, wherein the acquiring, by a measurement device, timestamp parameters comprises:

receiving, by the measurement device, the first transmit timestamp $T_{a1}$ and the second receive timestamp $T_{b2}$ that are sent by the first device; and receiving, by the measurement device, the first receive timestamp $T_{a2}$ and the second transmit timestamp $T_{b1}$ that are sent by the second device.

3. The method according to claim 1, wherein the acquiring, by a measurement device, timestamp parameters comprises:

receiving, by the measurement device, the timestamp parameters sent by the first device, wherein the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording;

or receiving, by the measurement device, the timestamp parameters sent by the second device, wherein the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

4. An optical fiber length measurement method, wherein the method is used to measure an optical fiber length between a first device and a second device, the first device and the second device are directly connected by using an optical fiber, and the method comprises:

acquiring, by the first device, timestamp parameters, wherein: the timestamp parameters comprise a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determining, by the first device, the optical fiber length L according to the timestamp parameters, wherein when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, wherein n is a natural number.

5. The method according to claim 4, wherein the acquiring, by the first device, timestamp parameters comprises:

obtaining, by the first device, the first transmit timestamp $T_{a1}$ and the second receive timestamp $T_{b2}$ by recording; and receiving, by the first device, the first receive timestamp $T_{a2}$ and the second transmit timestamp $T_{b1}$ that are sent by the second device.

6. An optical fiber length measurement apparatus, wherein the apparatus is configured to measure an optical fiber length between a first device and a second device, the first device and the second device are directly connected by using an optical fiber, the apparatus comprises a processor and nonvolatile memory coupled to the processor, and the nonvolatile memory stores computer programs which when executed by the processor cause the processor to:

acquire timestamp parameters, wherein: the timestamp parameters comprise a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determine the optical fiber length L according to the timestamp parameters, wherein when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, wherein n is a natural number.

7. The apparatus according to claim 6, wherein the computer programs cause the processor to:

receive the first transmit timestamp $T_{a1}$ and the second receive timestamp $T_{b2}$ that are sent by the first device; and receive the first receive timestamp $T_{a2}$ and the second transmit timestamp $T_{b1}$ that are sent by the second device.

8. The apparatus according to claim 6, wherein the computer programs cause the processor to:

receive the timestamp parameters sent by the first device, wherein the first receive timestamp $T_{a2}$ and the second transmit timestamp $T_{b1}$ are sent to the first device by the second device, and the first transmit timestamp $T_{a1}$ and the second receive timestamp $T_{b2}$ are obtained by the first device by recording;

or receive the timestamp parameters sent by the second device, wherein the first transmit timestamp $T_{a1}$ and the second receive timestamp $T_{b2}$ are sent to the second device by the first device, and the first receive timestamp $T_{a2}$ and the second transmit timestamp $T_{b1}$ are obtained by the second device by recording.

9. An optical fiber length measurement apparatus, wherein the apparatus is configured to measure an optical fiber length between a first device and a second device, the first device and the second device are directly connected by using an optical fiber, the apparatus comprises a processor and non-volatile memory coupled to the processor, and the non-volatile memory stores computer programs which when executed by the processor cause the processor to:

acquire timestamp parameters, wherein: the timestamp parameters comprise a first transmit timestamp $T_{a1}$, a first receive timestamp $T_{a2}$, a second transmit timestamp $T_{b1}$, and a second receive timestamp $T_{b2}$; the first transmit timestamp $T_{a1}$ is a transmit timestamp at which the first device sends a first measurement packet to the second device, the second transmit timestamp $T_{b1}$ is a transmit timestamp at which the second device sends a second measurement packet to the first device, the first receive timestamp $T_{a2}$ is a receive timestamp at which the second device receives the first measurement packet after sending the second measurement packet, and the second receive timestamp $T_{b2}$ is a receive timestamp at which the first device receives the second measurement packet after sending the first measurement packet; and an interval T at which the first device sends the first measurement packet is the same as an interval T at which the second device sends the second measurement packet; and determine the optical fiber length L according to the timestamp parameters, wherein when $(T_{a2}-T_{b1})+(T_{b2}-T_{a1}) \leq n*T$, $L=2.5*[(T_{a2}-T_{b1})+(T_{b2}-T_{a1})]$, or when $(T_{a2}-T_{b1})+(T_{b2}-T_{a1}) > n*T$, $L=2.5*[(T_{a2}-T_{b1})+(T_{b2}-T_{a1})-n*T]$, wherein n is a natural number.

10. The apparatus according to claim 9, wherein the computer programs cause the processor to:

obtain the first transmit timestamp $T_{a1}$ and the second receive timestamp $T_{b2}$ by recording; and receive the first receive timestamp $T_{a2}$ and the second transmit timestamp $T_{b1}$ that are sent by the second device.

* * * * *